A. MOFFITT.
Hub.
No. 36,355.
Patented Sept. 2, 1862.
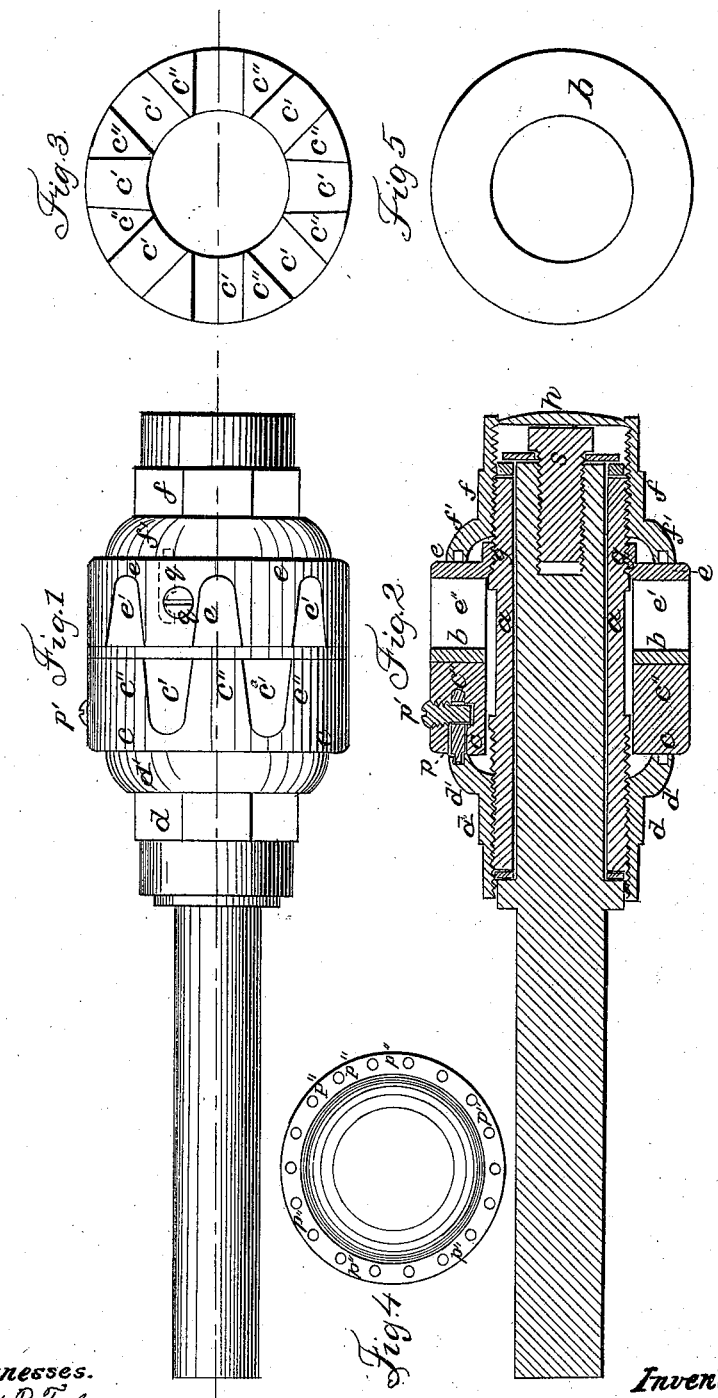

UNITED STATES PATENT OFFICE.

ALEXANDER MOFFITT, OF BROWNSVILLE, PENNSYLVANIA.

IMPROVEMENT IN HUBS FOR VEHICLES.

Specification forming part of Letters Patent No. 36,355, dated September 2, 1862.

*To all whom it may concern:*

Be it known that I, ALEXANDER MOFFITT, of Brownsville, in the county of Fayette and State of Pennsylvania, have invented a new and useful Improvement in the Construction of Metallic Hubs for Vehicles of all Kinds; and I do hereby declare that the following is a full, clear, and exact description of the construction and arrangement of the same, reference being had to the annexed drawings, making a part of this specification, in which—

Figure 1 is a front view. Fig. 2 is a section; Figs. 3, 4, and 5, views of separate parts to be hereinafter described.

The nature of my invention consists in the construction, arrangement, and combination of certain parts, the whole forming a new and improved hub for vehicles of all kinds.

This hub as a whole consists of six principal and two or more accessary parts, which I will proceed to describe by reference to the drawings, in all of which the same letter indicates the same parts.

$a$ is the barrel of the hub, or, in common language, the box, the axle of the wheel passing entirely through it and secured in place by a screw and washer, $s$, on its outer end. The box $a$ has a screw cut on each end, leaving an intervening space of about one-third the whole length smooth. On this intervening space is placed, fitting loosely, a flattened ring or perforated disk, $b$, in place on Figs. 1 and 2, and seen separately in Fig. 5. On the inner end of the box there comes next this central disk a piece, $c$, which may be called the "inner flanged disk." Like the central disk, it has a central circular orifice sufficiently large to pass freely over the box. This disk has a thick flange on its outer face, intervening between it and the central disk, in which are semi-elliptical or semi-oval mortises $c'$, extending radially from the center of the wheel, and thus leaving between them triangular solid portions of the flange $c''$. These mortises $c'$ are for the reception of the inner end of one set of the spokes of the wheel. To give a better grip upon the spoke, I prefer to make these mortises a little larger near the box or inner edge than on the periphery. Into one or more of the triangular solid portions of the flange $c''$, and through the disk, a hole is drilled or otherwise made to receive a fastening-pin, $p$, which is secured in its place by a screw, $p'$, let into the outer face of the solid triangular part, as seen in Figs. 1 and 2. The function of this pin, which is one of the accessary parts previously referred to, will be explained hereinafter.

The next principal part of the hub toward the body of the vehicle is a nut or female screw, $d$, fitted to the inner screw on the box. It has a cup-shaped flange, $d'$, extending from it toward the disk $c$, leaving an air-chamber between it and the box. On the lip of the free edge of this cup-shaped flange are drilled a number of holes, $p''$, extending entirely around it and corresponding in size to the one or more just referred to in the disk and triangular solid part of $c$ and $c''$. The object of this particular arrangement is this: When the nut $d$, with its flange $d'$, is screwed up firmly against the flange $c$ and the faces of the two brought together, so that the hole or holes in the disk $c$ is or are opposite one or more of those in the lip of the cup-shaped flange $d'$, the pin $p$ is pushed out of its receptacle to a certain distance and into the corresponding hole in $d'$, and secured in this position by the screw $p'$, thus holding both the parts $c$ and $d$ firmly together, and, with the assistance of the spokes fixed and immovable, so long as these pins retain this position.

Turning now to the outer end of the hub next the central disk, $b$, we have another disk $e$, with a flange like that before described on the disk $c$, with similar semi-elliptical or semi-oval mortises, $e'$, for a second set of spokes, with like intervening triangular solid portions, in one or more of which solid portions are also made holes, as above described, in $c$ for the reception of a pin, $q$, by the screw $q'$. This disk, however, differs from the former, $c$, in having a lip, $g$, around the central orifice, in which is cut a female screw that fits and takes onto the thread of the screw on the outer end of the box. Finally, the outer end of the hub has on it another female screw or nut, $f$, with a cup-shaped disk and perforated lip, $f'$, as in nut $d$, and operating in a similar manner. This screw or nut $f$ is not, however, perforated on its outer end, but has this part closed by a solid diaphragm, $h$, by which it not only covers securely the end of the box and axle, but becomes an excellent oil-cup for lubricating these parts. This female screw or nut $f$ is not, however, absolutely necessary as a part of the hub, because the lip $g$ of the disk $e$ may be extended so as to cover the ends of the box and axle, as is ordinarily done in common hubs.

In putting together the several parts of my hub the disk $e$ is first screwed on the box, the central disk is then put on; and the two brought together, the latter occupying, as near as possible, a central point on the longitudinal extent of the box. The disk $c$ is then put on the other or inner end of the box and the female screw $d$ screwed on after it until it brings the free face of the flange $c'$ against the central disk. The outer nut or oil-cup, $f$, is then screwed on the box until the lip of the cup-shaped flange comes up to the disk $e$. The pins $p$ and $q$ are then pushed outward into one of the holes in the lips of the cup-shaped flanges and secured in this position by the screws $p'$ and $q'$. In putting the parts together I prefer to make the mortises to stand alternately on the sides of the central disk, as this enables me to give greater strength to the wheel in the arrangement of the spokes than would be obtained by placing them directly opposite each other. It will be seen from this that I use a double series of spokes in each wheel, thus giving it a double dish shape, each set of spokes having a greater or less obliquity dependent upon the thickness of the central disk.

The flattened semi-oval or semi-elliptical form of the mortises enables me, in tightening the parts, to get a much firmer and more uniform grasp upon the end of the spoke than can be obtained by a square or any other rectilinear form. I make my spoke without shoulder and of the same form, or nearly so, throughout its entire length, and the exposed surfaces of the spoke having a rounded face are much less liable to injury than when they terminate in sharp corners or edges. Besides, by this uniformity in size and and shape I am enabled to manufacture my spokes very economically and replace one that has been broken or injured with the greatest facility and even without taking off the tire. This facility of replacing a broken or injured spoke is such that almost any person can do it, thus obviating the necessity of applying to the blacksmith or wheelwright.

Having thus fully described my invention, what I claim therein, and desire to secure by Letters Patent of the United States, is—

1. The box $a$, in combination with the part $b$, and parts $c$ $d$ $e$, with their appendages or flanges, substantially as described.

2. The pins $p$ and $q$, with their fastening-screws $p'$ and $q'$, in combination with the holes in the lips of the cup-shaped flanges $d'$ and $f'$, as described.

3. The screw-nut $d$ and flange $d'$ for tightening the disk $c$ and flange $c''$ upon the ends of the spokes.

4. The screw-nut $f$, with its flange $f'$ and imperforate diaphragm $h$, constructed in the manner and for the purposes specified.

5. The semi-elliptical or semi-oval mortises $c'$ and $e'$, constructed in the manner and for the purposes set forth.

ALEX. MOFFITT.

Witnesses:
   H. KING,
   CLARENCE T. SMITH.